US009300735B2

(12) United States Patent
Ting et al.

(10) Patent No.: US 9,300,735 B2
(45) Date of Patent: Mar. 29, 2016

(54) METHOD AND SYSTEM FOR CONTROLLING FLOW OF CONTENT DELIVERY NETWORK AND PEER TO PEER NETWORK

(71) Applicant: INDUSTRIAL TECHNOLOGY RESEARCH INSTITUTE, Hsinchu (TW)

(72) Inventors: Wei-Chih Ting, Taichung (TW); Hua-Lung Tsai, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 387 days.

(21) Appl. No.: 13/928,484

(22) Filed: Jun. 27, 2013

(65) Prior Publication Data
US 2014/0189006 A1 Jul. 3, 2014

(30) Foreign Application Priority Data
Dec. 28, 2012 (TW) .............................. 101151164 A (51) Int. Cl.
G06F 15/16 (2006.01)
H04L 29/08 (2006.01)

(52) U.S. Cl.
CPC .......... *H04L 67/104* (2013.01); *H04L 67/1085* (2013.01); *H04L 67/1091* (2013.01)

(58) Field of Classification Search
None
See application file for complete search history.

(56) References Cited

U.S. PATENT DOCUMENTS

| | | | |
|---|---|---|---|
| 7,142,641 B2 | 11/2006 | Hinkson et al. | |
| 7,512,969 B2 | 3/2009 | Gould et al. | |
| 7,783,777 B1 | 8/2010 | Pabla et al. | |
| 8,112,479 B2 | 2/2012 | Guan | |
| 8,239,514 B2 | 8/2012 | Richardson et al. | |
| 2008/0155061 A1 | 6/2008 | Afergan et al. | |
| 2008/0273541 A1* | 11/2008 | Pharn | H04L 65/4076 370/400 |
| 2009/0092144 A1* | 4/2009 | Wepiwe | H04L 12/42 370/406 |
| 2009/0125393 A1 | 5/2009 | Hwang et al. | |
| 2011/0078312 A1* | 3/2011 | Rimac | H04L 67/104 709/227 |
| 2011/0093607 A1 | 4/2011 | Wang et al. | |

(Continued)

FOREIGN PATENT DOCUMENTS

| | | |
|---|---|---|
| CN | 101170452 | 4/2008 |
| CN | 101217391 | 7/2008 |
| CN | 101237418 | 8/2008 |

(Continued)

OTHER PUBLICATIONS

English Abstract translation of CN101267379 (Published Sep. 17, 2008).

(Continued)

*Primary Examiner* — Ryan Jakovac
(74) *Attorney, Agent, or Firm* — McClure, Qualey & Rodack, LLP (57) ABSTRACT

A method and a system for controlling a flow of a content delivery network (CDN) and a peer to peer (P2P) network are provided. The method includes the following steps. Data is transmitted via the CDN and the P2P network. A sharing rate is obtained from the P2P network by a P2P network tracker module. A first service cost rate is calculated according to the sharing rate by a logical controlling module. The CDN is controlled to accept or reject one or more new requests from the P2P network according to the first service cost rate by the logical controlling module.

29 Claims, 6 Drawing Sheets

(56) References Cited

U.S. PATENT DOCUMENTS

| | | | | |
|---|---|---|---|---|
| 2011/0202405 A1* | 8/2011 | Clark | ............... | G06Q 30/0251 705/14.49 |
| 2012/0317197 A1* | 12/2012 | De Foy | ............... | H04L 67/1063 709/204 |

FOREIGN PATENT DOCUMENTS

| | | |
|---|---|---|
| CN | 101267379 | 9/2008 |
| CN | 101383853 | 3/2009 |
| CN | 101933308 A | 12/2010 |
| TW | 200833028 | 8/2008 |
| TW | 201039121 | 11/2010 |
| TW | 201040713 | 11/2010 |
| TW | 201130308 | 9/2011 |
| TW | 201212601 | 3/2012 |
| TW | M430774 | 6/2012 |

OTHER PUBLICATIONS

English Abstract translation of CN101170452 (Published Apr. 30, 2008).
English Abstract translation of CN101217391 (Published Jul. 9, 2008).
English Abstract translation of CN101237418 (Published Aug. 6, 2008).
English Abstract translation of CN101383853 (Published Mar. 11, 2009).
English Abstract translation of TW200833028 (Published Aug. 1, 2008).
English Abstract translation of TW201039121 (Published Nov. 1, 2010).
English Abstract translation of TW201040713 (Published Nov. 16, 2010).
English Abstract translation of TW201130308 (Published Sep. 1, 2011).
English Abstract translation of TW201212601 (Published Mar. 16, 2012).
English Abstract translation of TWM430774 (Published Jun. 1, 2012).
Horvath, et al.: "Dissecting PPLive, SopCast, TVAnts"; Napa-Wine project, Nov. 2010.
Jiang, et al.: "Efficient Large-scale Content Distribution with Combination of CDN and P2P Networks"; International Journal of Hybrid Information Technology vol. 2, No. 2, Apr. 2009.
"A Study of PPStream IPTV System Based-On Network Measurement"; Beijing Jiaotong University, Thesis, Jun. 16, 2009; http://www.docin.com/p-49977607.html.
Ha, et al.: "A novel Hybrid CDN-P2P mechanism for effective real-time media streaming"; Université Pierre et Marie Curie 4 Place Jussieu; Jan. 2009.
Mansy, et al.: "Analysis of Adaptive Streaming for Hybrid CDN/P2P Live Video Systems"; Jan. 2011; In proceeding of: Proceedings of the 19th annual IEEE International Conference on Network Protocols, ICNP 2011, Vancouver, BC, Canada, Oct. 17-20, 2011.
Xu, et al.: "Analysis of a CDN-P2P Hybrid Architecture for Cost-Effective Streaming Media Distribution"; Multimedia Syst., 2006.
Yin, et al.: "Design and Deployment of a Hybrid CDN-P2P System for Live Video Streaming: Experiences with LiveSky"; MM'09, Oct. 19-24, 2009, Beijing, China. Copyright 2009.
Seyyedi, et al.: "Hybrid CDN-P2P Architectures for Live Video Streaming: Comparative Study of Connected and Unconnected Meshes"; 2011 International Symposium on Computer Networks and Distributed Systems, Feb. 23-24, 2011.
Lu, et al.: "Scalable and Reliable Live Streaming Service through Coordinating CDN and P2P"; 2011 IEEE 17th International Conference on Parallel and Distributed Systems.
"Service quality in P2P streaming systems Computer Science Review", vol. 5, Issue 4, Nov. 2011, pp. 319-340 (Oct. 13, 2011).
"An Alliance Based Peering Scheme for P2P Live Media Streaming", IEEE Transaction on multimedia, vol. 9, No. 8, Dec. 2007.
Full English (machine) translation of CN101933308 (Published Dec. 29, 2010).
TW Office Action dated Nov. 20, 2014.

* cited by examiner

METHOD AND SYSTEM FOR CONTROLLING FLOW OF CONTENT DELIVERY NETWORK AND PEER TO PEER NETWORK

This application claims the benefit of Taiwan application Serial No. 101151164, filed Dec. 28, 2012, the disclosure of which is incorporated by reference herein in its entirety.

TECHNICAL FIELD

The disclosure relates in general to a method and a system for controlling a flow, and more particularly to a method and a system for controlling a flow of a content delivery network (CDN) and a peer to peer (P2P) network.

BACKGROUND

Along with the development in information technology, the applications of the network are increasing. Users can obtain a lot of information from the network. Due to the digitization of the images, videos and other data, user can easily obtain images and videos from the network.

In order to meet the requirement of transmission of large data, such as images and videos, it is a workable approach to increase the network bandwidth. On the other hand, a suitable configuration of network servers and clients may also effectively improve the efficiency of the transmission and extend the range of transmission.

SUMMARY

The disclosure is directed to a method and a system for controlling a flow of a content delivery network (CDN) and a peer to peer (P2P) network.

According to one embodiment, a method for controlling a flow of a content delivery network (CDN) and a peer to peer (P2P) network is provided. The method includes the following steps. Data is transmitted via the CDN and the P2P network. A sharing rate is obtained from the P2P network by a P2P network tracker module. A first service cost rate is calculated according to the sharing rate by a logical controlling module. The CDN is controlled to accept or reject one or more new requests from the P2P network according to the first service cost rate by the logical controlling module.

According to another embodiment, a system for controlling a flow of a content delivery network (CDN) and a peer to peer (P2P) network is provided. The system includes a P2P network tracker module and a logical controlling module. The P2P network tracker module is for obtaining a sharing rate from the P2P network. The logical controlling module is for calculating a first service cost rate according to the sharing rate and controlling the CDN to accept or reject one or more new requests from the P2P network according to the first service cost rate.

The above and other aspects of the disclosure will become better understood with regard to the following detailed description of the non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
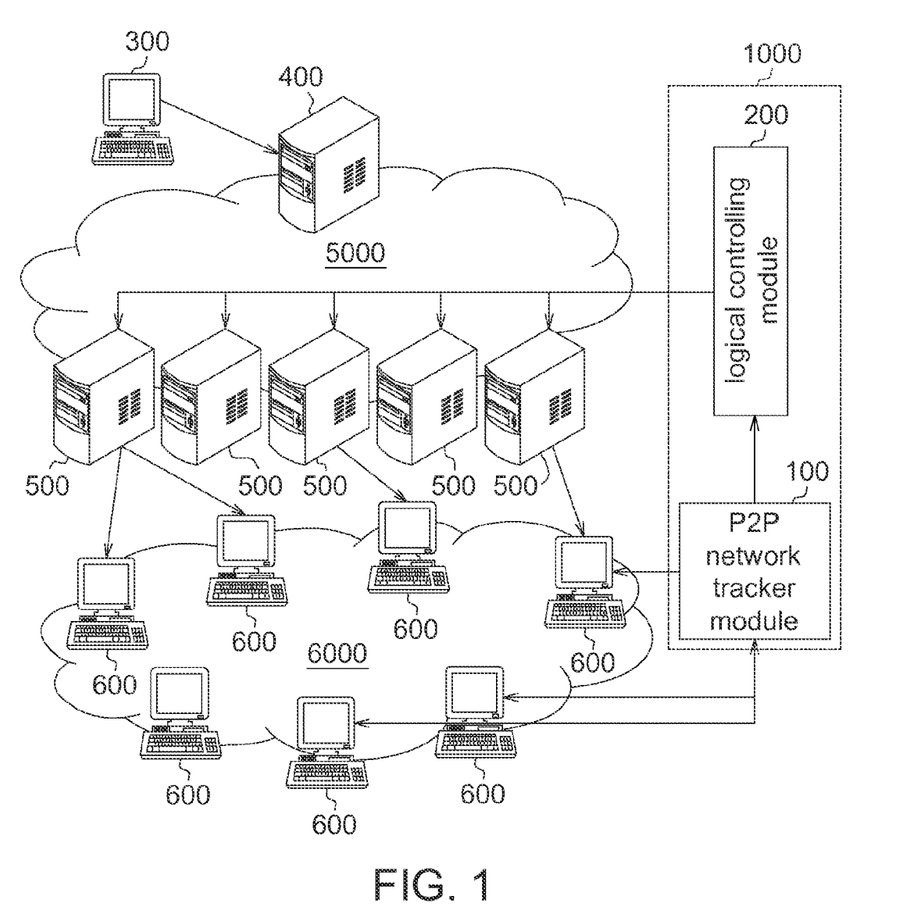
FIG. 1 shows a content delivery network (CDN), a peer to peer (P2P) network and a system for controlling a flow of the CDN and the P2P network.

Refer to FIG. 1, which shows a content delivery network (CDN) 5000, a peer to peer (P2P) network 6000, and a system 1000 for controlling a flow of the CDN 5000 and the P2P network 6000. The P2P network 6000 is to reduce the bandwidth requirement of a service provider. The service of data transmission can be changed to a distributed architecture from a centralized architecture. The CDN 5000 can increase the speed of accessing the network and prevent from the failure of accessing the network which is caused by the large number of clients and the long distance across the globe. However, CDN 5000 may be costly.

In one embodiment, after a data provider 300 provides data to an origin server 400 of the CDN 5000, the data are copied or cached from the origin server 400 to a plurality of edge servers 500.

The P2P network 6000 transmits data by a plurality of clients 600. The P2P network 6000 is used between varied clients 600 to directly exchange data in a peer-to-peer manner. Each client 600 plays both as a data consumer and a data provider. If the number of the clients 600 of the P2P network 6000 is increased, then the number of the data providing sources is increased accordingly. However, when the data is transmitted via the P2P network 6000, the clients 600 transmit the data hop by hop and it creates a source-to-end delay for the last client 600.

In one embodiment, when one of the clients 600 receives the data, then the data can be transmitted to another client 600. When one of the clients 600 needs the data, one or more new requests are sent to another client 600 who has the data.

In the present embodiment, the CDN 5000 and the P2P network 6000 are combined. The system 1000 is used for controlling the CDN 5000 to gain the maximum efficiency while providing an acceptable service quality.

The system 1000 includes a P2P network tracker module 100 and a logical controlling module 200. The P2P network tracker module 100 is used for obtaining varied information. For example, the P2P network tracker module 100 can be a computer, a firmware circuit, a processing chip or a storage medium storing a plurality of program codes.

The logical controlling module 200 is used for performing a logical processing process or a controlling process. For example, the logical controlling module 200 can be a computer, a firmware circuit, a processing chip or a storage medium storing a plurality of program codes.

The P2P network tracker module 100 and the logical controlling module 200 may be configured in one server or be configured in two servers separately. Or, the P2P network tracker module 100 and the logical controlling module 200 may be part of one edge server 500.

In the P2P network 6000, a new client 600 or an existing client 600 may request data from the edge server 500. The logic controlling module 200 performs calculation according to the information of the P2P network 6000 obtained by the P2P network tracker module 100, to control the edge server 500 to provide the data or not.

Figure 2:
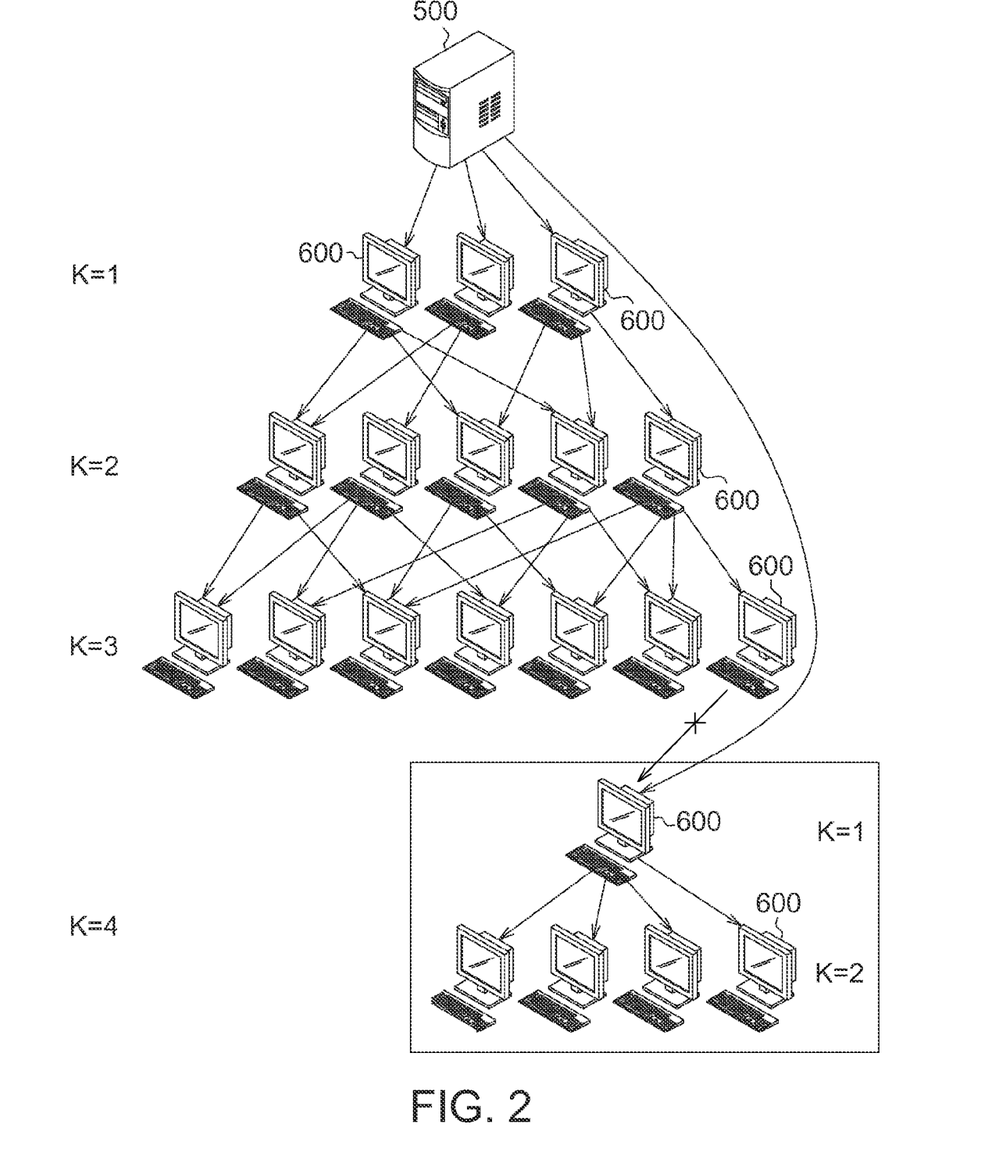
FIG. 2 shows that the CDN is switched to accept one or more new requests.

For example, please refer to FIG. 2, which shows that the CDN 5000 is switched to accept one or more new requests. In the P2P network 6000, the logical controlling module 200 performs calculation according to the information of the P2P network 6000 obtained by the P2P network tracker module 100. If the service cost rate is determined to be within an acceptable range, then the logical controlling module 200 controls the edge server 500 not to provide any data in response to one or more new requests, but provide data to the client 600 located at level 1. With the joining of new clients 600, the data transmission architecture is extended from level 1 to level 3. Before the P2P network 6000 is extended to level 4, the logical controlling module 200 performs calculation according to the information of the P2P network 6000 obtained by the P2P network tracker module 100. If the service cost rate is determined to be out of the acceptable range, then the logical controlling module 200 controls the edge server 500 to provide data in response to one or more new requests. When the client 600 at level 4 of the FIG. 2 makes one or more new requests, then the client 600 can obtain data from the edge server 500 to be a new node of level 1.

For clearly illustrating the operation of the system for controlling the flow, a flow chart is provided. Please refer to FIG. 3, which shows the flow chart of an embodiment of the method for controlling the flow of the CDN 5000 and the P2P network 6000. In step S110, the data provider 300 uploads or streams data to the origin server 400. In the CDN 5000, the data is transmitted to a plurality of edge servers 500. A plurality of clients 600 download data from the edge servers directly. More clients 600 transmit data to each other via the P2P network 6000.

Figure 3:
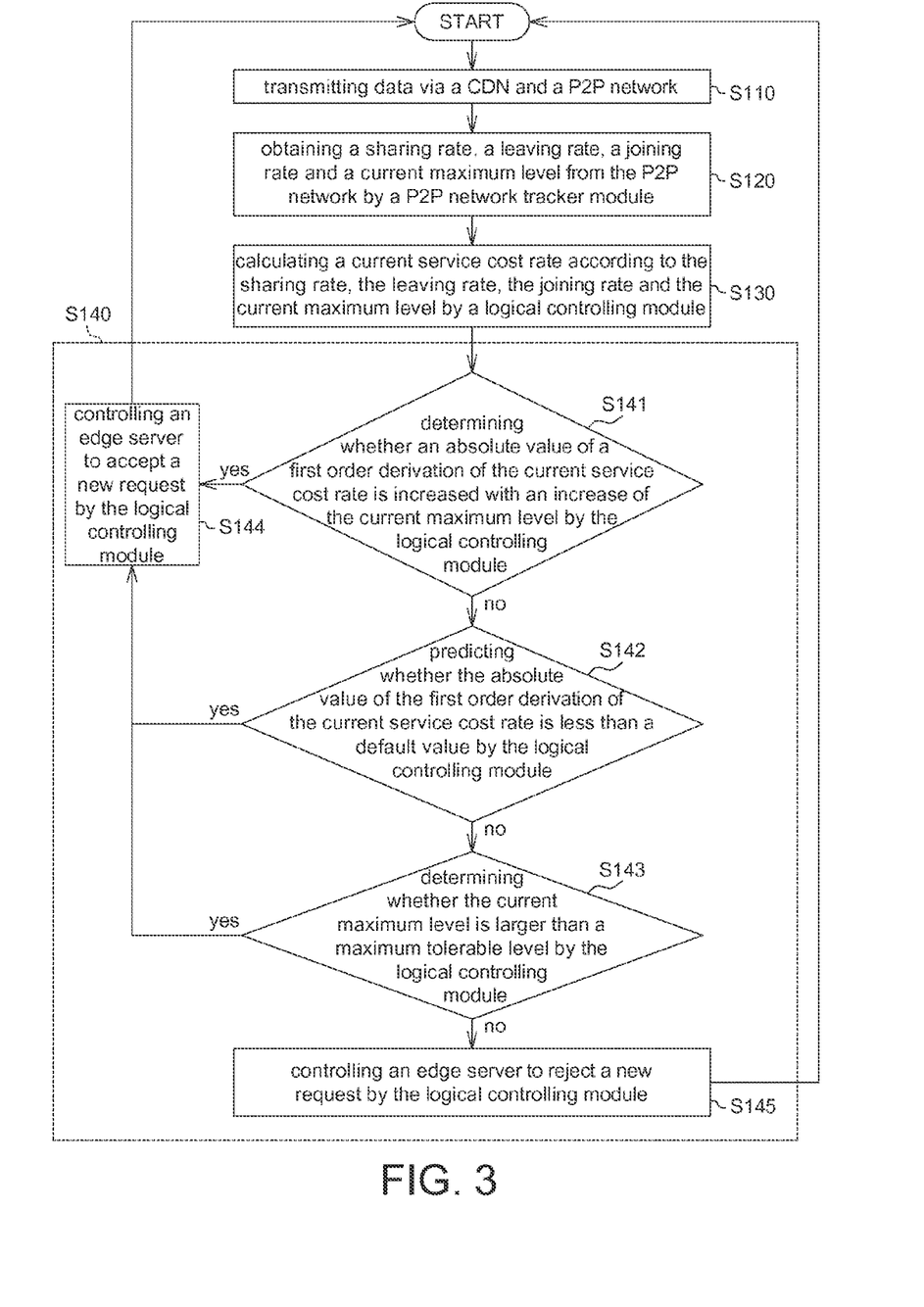
FIG. 3 shows a flow chart of an embodiment of the method for controlling the flow of the CDN and the P2P network.

In step S120, the P2P network tracker module 100 obtains a sharing rate ρ, a leaving rate σ, a joining rate λ and a current maximum level k. The sharing rate ρ is a ratio of an uploading flow to a downloading flow during a unit time. The leaving rate σ is a ratio of the number of the clients leaving the P2P network 6000 to the number of the clients existing in the P2P network 6000 during a unit time. The joining rate λ is the number of the clients joining the P2P network 6000 to the number of the clients existing in the P2P network 6000 during a unit time. The current maximum level k is the depth of the deepest level in the P2P network 6000. In the P2P network 6000, the data may be transmitted among the clients 600 with a tree structure or a mesh structure. Or, the data may be divided into several sub-data which are transmitted to different clients 600 separately. The current maximum level k is the maximum depth of the path for transmitting the same piece of data. In the P2P network 6000, one client 600 may actively transmit data to another client 600. Or, one client 600 may make one or more new requests to another client 600, and then the new requested client 600 decides to accept the one or more new requests or not.

In step S130, the logical controlling module 200 calculates a current service cost rate f(k,ρ,λ,σ) which is a first service cost rate according to the sharing rate ρ, the leaving rate σ, the joining rate λ and the current maximum level k. The current service cost rate f(k,ρ,λ,σ) is a ratio of the number of clients of the CDN 5000 to the number of clients of the P2P network 6000 and the CDN 5000. The clients of the CDN 5000 are the clients who acquire data directly from the edge server 500.

For example, the current service cost rate f(k,ρ,λ,σ) may be calculated by the following equation (1). In another embodiment, the current service cost rate f(k,ρ,λ,σ) may be calculated by another equation.

$$f(k, \rho, \lambda, \sigma) = \frac{(1-\rho)(1+\lambda-\sigma)^k}{(1-\rho^k)(1-\sigma)^{k-1}} \quad (1)$$

$$f(\rho) = (1-\rho) \quad (2)$$

$$f(\rho, \lambda, \sigma) = (1-\rho)(1+\lambda-\sigma) \quad (3)$$

In step S140, the logical controlling module 200 controls the CDN 5000 to accept or reject one or more new requests according to the current service cost rate f(k,ρ,λ,σ). In the present embodiment, the step S140 includes three steps S141, S142 and S143. If any determination in the steps S141, S142 and S143 is passed, then the process proceeds to step S144; if all of the determinations in the steps S141, S142 and S143 are not passed, then the process proceeds to step S145.

In step S144, the logical controlling module 200 controls the edge server 500 to accept one or more new requests.

In step S145, the logical controlling module 200 controls the edge server 500 to reject one or more new requests.

In step S141, the logical controlling module 200 determines whether an absolute value of a first order derivation of the current service cost rate |f'(k,ρ,λ,σ)| is increased with an increase of the current maximum level k. If the absolute value of the first order derivation of the current service cost rate |f'(k,ρ,λ,σ)| is increased with the increase of the current maximum level k, then the process proceeds to step S144; if the absolute value of the first order derivation of the current service cost rate |f'(k,ρ,λ,σ)| is not increased with the increase of the current maximum level k, then the process proceeds to step S142.

When the absolute value of the first order derivation of the current service cost rate |f'(k,ρ,λ,σ)| is increased with the increase of the current maximum level k, the current service cost rate f(k,ρ,λ,σ) is turned from gradual decrease to gradual increase and a lowest point is appeared or passed. Therefore, the CDN 5000 may need to accept new requests for improving the data transmission; otherwise, there might be some clients which cannot obtain data, obtain incomplete data, or obtain data with an unexpected long delay.

For example, please refer to items 1-1 to 1-4 of table 1. When the sharing rate ρ is 0.2 and the current maximum level k is 3, it is predicted that the determination of the step S141 will be passed when the current maximum level k is increased to 4. Therefore, when the current maximum level k is 4, the CDN 5000 is controlled to accept one or more new requests from a new client 600 or from a reconnecting client 600.

Please refer to items 2-1 to 2-3 of table 1. When the joining rate λ doubles, i.e. 0.054 compared with items 1-1 to 1-4 of table 1, and when the current maximum level k is increased to 2, it is predicted that the determination of the step S141 will be passed when the current maximum level k is increased to 3. Therefore, when the current maximum level k is 3, the CDN 5000 is controlled to accept one or more new requests from a client 600 or from a reconnecting client 600.

Please refer to items 3-1 to 3-4 of table 1. When the leaving rate σ doubles, i.e. 0.048 compared with items 1-1 to 1-4 of table 1, and the current maximum level k is increased to 3, it is predicted that the determination of the step S141 will be passed when the current maximum level k is increased to 4. Therefore, when the current maximum level k is 4, the CDN 5000 is controlled to accept one or more new requests from a client 600 or from a reconnecting client 600.

TABLE 1

| item | ρ | k | σ | λ | f(k, ρ, λ, σ) | |f'(k, ρ, λ, σ)| |
|---|---|---|---|---|---|---|
| 1-1 | 0.2 | 1 | 0.024 | 0.027 | −0.3762 | 0.376196 |
| 1-2 | 0.2 | 2 | 0.024 | 0.027 | −0.0342 | 0.034162 |
| 1-3 | 0.2 | 3 | 0.024 | 0.027 | −0.0122 | 0.012223 |
| 1-4 | 0.2 | 4 | 0.024 | 0.027 | 0.0216 | 0.021552 |
| 2-1 | 0.2 | 1 | 0.024 | 0.054 | −0.3590 | 0.358963 |
| 2-2 | 0.2 | 2 | 0.024 | 0.054 | −0.0120 | 0.011964 |
| 2-3 | 0.2 | 3 | 0.024 | 0.054 | 0.0378 | 0.037811 |
| 3-1 | 0.2 | 1 | 0.048 | 0.027 | −0.3665 | 0.366531 |
| 3-2 | 0.2 | 2 | 0.048 | 0.027 | −0.0328 | 0.032798 |
| 3-3 | 0.2 | 3 | 0.048 | 0.027 | 0.0125 | 0.012513 |
| 3-4 | 0.2 | 4 | 0.048 | 0.027 | 0.0217 | 0.021658 |

Please refer to table 2, where the sharing rate ρ is 0.4. In items 1-1 to 1-5 of table 2, when the current maximum level k is increased to 4, it is predicted that the determination of step S141 will be passed when the current maximum level k is increased to 5. Therefore, when the current maximum level k is 5, the CDN 5000 is controlled to accept one or more new requests from a client 600 or from a reconnecting client 600.

Please refer to items 2-1 to 2-4 of table 2. When the joining rate λ doubles, i.e. 0.054 compared with items 1-1 to 1-5 of table 2, and when the current maximum level k is increased to 3, it is predicted that the determination of step S141 will be passed when the current maximum level k is increased to 4. Therefore, when the current maximum level k is 4, the CDN 5000 is controlled to accept one or more new requests from a client 600 or from a reconnecting client 600.

Please refer to 3-1 to 3-5 of table 2. When the leaving rate σ doubles, i.e. 0.048 compared with items 1-1 to 1-5 of table 2, and when the current maximum level k is increased to 4, it is predicted that the determination of step S141 will be passed when the current maximum level k is increased to 5. Therefore, when the current maximum level k is 5, the CDN 5000 is controlled to accept one or more new requests from a client 600 or from a reconnecting client 600.

TABLE 2

| item | ρ | k | σ | λ | f(k, ρ, λ, σ) | |f'(k, ρ, λ, σ)| |
|---|---|---|---|---|---|---|
| 1-1 | 0.4 | 1 | 0.024 | 0.027 | −0.5853 | 0.585323 |
| 1-2 | 0.4 | 2 | 0.024 | 0.027 | −0.1084 | 0.108408 |
| 1-3 | 0.4 | 3 | 0.024 | 0.027 | −0.0240 | 0.024013 |
| 1-4 | 0.4 | 4 | 0.024 | 0.027 | 0.0022 | 0.002155 |
| 1-5 | 0.4 | 5 | 0.024 | 0.027 | 0.0121 | 0.012077 |
| 2-1 | 0.4 | 1 | 0.024 | 0.054 | −0.5737 | 0.573719 |
| 2-2 | 0.4 | 2 | 0.024 | 0.054 | −0.0937 | 0.093698 |
| 2-3 | 0.4 | 3 | 0.024 | 0.054 | −0.0065 | 0.006472 |
| 2-4 | 0.4 | 4 | 0.024 | 0.054 | 0.0222 | 0.022198 |
| 3-1 | 0.4 | 1 | 0.048 | 0.027 | −0.5707 | 0.570653 |
| 3-2 | 0.4 | 2 | 0.048 | 0.027 | −0.1054 | 0.105398 |
| 3-3 | 0.4 | 3 | 0.048 | 0.027 | −0.0230 | 0.023020 |
| 3-4 | 0.4 | 4 | 0.048 | 0.027 | 0.0026 | 0.002552 |
| 3-5 | 0.4 | 5 | 0.048 | 0.027 | 0.0123 | 0.012270 |

In step S142, the logical controlling module 200 predicts whether the absolute value of the first order derivation of the current service cost rate $|f'(k,\rho,\lambda,\sigma)|$ is less than a default value, when the current maximum level k is increased to k+1. If the absolute value of the first order derivation of a future service cost rate $|f'(k+1,\rho,\lambda,\sigma)|$ is less than the default value, then the process proceeds to step S144; if the absolute value of the first order derivation of the future service cost rate $|f'(k+1,\rho,\lambda,\sigma)|$ is not less than the default value, then the process proceeds to step S143.

The default value, for example, is 0.01. When the absolute value of the first order derivation of the current service cost rate $|f'(k,\rho,\lambda,\sigma)|$ is less than the default value, the current service cost rate $f(k,\rho,\lambda,\sigma)$ is rather low. Therefore, the CDN 5000 may need to accept new requests for improving the data transmission; otherwise, there may be some clients which cannot obtain data, obtain incomplete data, or obtain data with an unexpected long delay.

In step S143, the logical controlling module 200 determines whether the current maximum level k is larger than a maximum tolerable level. If the current maximum level k is larger than the maximum tolerable level, then the process proceeds to step S144; if the current maximum level k is not larger than the maximum tolerable level, then the process proceeds to step S145. In another embodiment, the step S143, the logical controlling module 200 may determine whether the next current maximum level k+1 is larger than the maximum tolerable level.

For example, the maximum tolerable level is 25. In some related research, such as researches provided from SopCast, TVAnts, or PPLive, the levels of 90% of the clients are less than 25. When the current maximum level k is larger than the maximum tolerable level, the transmission hierarchy of the P2P network 6000 is rather deep and the transmission delay between the data provider 300 and the last client 600 is unacceptable. Therefore, the CDN 5000 is controlled to accept new requests for reducing the depth of the P2P network 6000.

For example, please refer to table 3. The sharing rate ρ is 1.2. Because the sharing rate ρ is good, even if the current maximum level k is large. The service cost rate is gradual decreasing with the current maximum level k, and the quality of transmission can be kept well. Under the requirement of the minimum transmission delay, the maximum tolerable level may be a small number, such as "9". When the current maximum $^k$ is increased to 10, the logical controlling module 200 determines the determination of step S143 will be passed. Therefore, when the current maximum level k is 10, a new client 600 or a reconnecting client 600 can get data from the edge servers 500 of the CDN 5000 and later new clients 600 may become child nodes of this client 600, such that the current maximum level k can be reduced.

TABLE 3

| item | ρ | k | σ | λ | f(k, ρ, λ, σ) | |f'(k, ρ, λ, σ)| |
|---|---|---|---|---|---|---|
| 1-1 | 1.2 | 1 | 0.024 | 0.027 | −1.0698 | 1.069841 |
| 1-2 | 1.2 | 2 | 0.024 | 0.027 | −0.2668 | 0.266776 |
| 1-3 | 1.2 | 3 | 0.024 | 0.027 | −0.1180 | 0.117996 |
| . | . | . | . | . | . | . |
| . | . | . | . | . | . | . |
| . | . | . | . | . | . | . |
| 1-9 | 1.2 | 9 | 0.024 | 0.027 | −0.0119 | 0.011930 |
| 1-10 | 1.2 | 10 | 0.024 | 0.027 | −0.0094 | 0.009392 |
| 2-1 | 1.2 | 1 | 0.024 | 0.054 | −1.0713 | 1.07128 |
| 2-2 | 1.2 | 2 | 0.024 | 0.054 | 0.2682 | 0.268208 |
| 2-3 | 1.2 | 3 | 0.024 | 0.054 | −0.1194 | 0.119412 |
| . | . | . | . | . | . | . |
| . | . | . | . | . | . | . |
| . | . | . | . | . | . | . |
| 2-9 | 1.2 | 9 | 0.024 | 0.054 | −0.0131 | 0.013127 |
| 2-10 | 1.2 | 10 | 0.024 | 0.054 | −0.0105 | 0.010539 |
| 3-1 | 1.2 | 1 | 0.048 | 0.027 | −1.0436 | 1.043575 |

TABLE 3-continued

| item | ρ | k | σ | λ | f(k, ρ, λ, σ) | \|f'(k, ρ, λ, σ)\| |
|---|---|---|---|---|---|---|
| 3-2 | 1.2 | 2 | 0.048 | 0.027 | −0.2603 | 0.260259 |
| 3-3 | 1.2 | 3 | 0.048 | 0.027 | −0.1151 | 0.115136 |
| . | . | . | . | . | . | . |
| . | . | . | . | . | . | . |
| . | . | . | . | . | . | . |
| 3-9 | 1.2 | 9 | 0.048 | 0.027 | −0.0117 | 0.011668 |
| 3-10 | 1.2 | 10 | 0.048 | 0.027 | −0.0092 | 0.009191 |

In one embodiment, the sequence of the steps S141, S142, S143 can be changed. Or, one or two of the steps S141, S142, S143 can be adopted for controlling the flow. The flow chart can be adjusted according to varied status and need.

Figure 4:
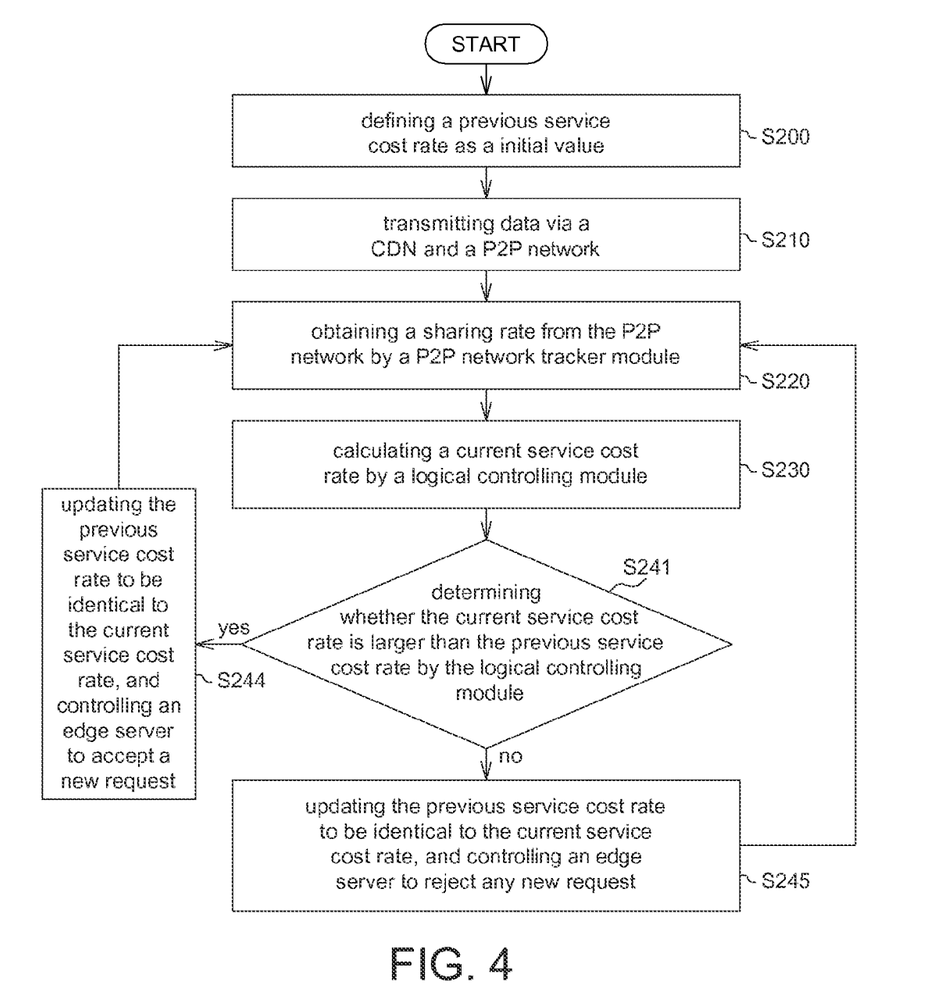
FIG. 4 shows a flow chart of another embodiment of the method for controlling the flow of the CDN and the P2P network.

In another embodiment, a service cost rate f(ρ) can be calculated according to the sharing rate ρ. The edge server 500 is controlled to accept or reject one or more new requests according to the comparison between a current service cost rate f(ρ) and a previous service cost rate f(ρ) which is a second service cost rate. For example, please refer to FIG. 4, which shows a flow chart of another embodiment of the method for controlling the flow of the CDN 5000 and the P2P network 6000. Some of the steps in FIG. 4 are similar to the steps in FIG. 3 and are omitted here. In step S200, set the previous service cost rate f(ρ) to an initial value, such as a value smaller or equal to 0.

In step S210, transmit data via the CDN 5000 and the P2P network 6000.

In step S220, the P2P network tracker module 100 obtains the sharing rate ρ from the P2P network 6000.

In step S230, the logical controlling module 200 calculates the current service cost rate f(ρ). The current service cost rate f(ρ) is calculated by the equation (2).

In step S241, S244 and S245, the logical controlling module 200 controls the CDN 5000 to accept or reject one or more new requests according to the current service cost rate f(ρ).

In step S241, the logical controlling module 200 determines whether the current service cost rate f(ρ) is larger than the previous service cost rate f(ρ). If the current service cost rate f(ρ) is larger than the previous service cost rate f(ρ), then the process proceeds to step S244; if the current service cost rate f(ρ) is not larger than the previous service cost rate f(ρ), then the process proceeds to step S245.

In step S244, the previous service cost rate f(ρ) is updated to be identical to the current service cost rate f(ρ), and the edge server is controlled to accept one or more new requests.

In step S245, the previous service cost rate f(ρ) is updated to be identical to the current service cost rate f(ρ), and the edge server 500 is controlled to reject any new request.

In another embodiment, a service cost rate f(ρ,λ,σ) can be calculated according to the sharing rate ρ, the joining rate λ and the leaving rate σ. The edge server 500 is controlled to accept or reject one or more new requests according to the comparison between the current service cost rate f(ρ,λ,σ) and the previous service cost rate f(ρ,λ,σ). For example, please refer to FIG. 5, which shows a flow chart of another embodiment of the method for controlling the flow of the CDN 5000 and the P2P network 6000. Steps S300, S310, S341, S344 and S345 are similar to the steps S200, S210, S241, S244 and S245 of FIG. 4 respectively, and are omitted here.

Figure 5:
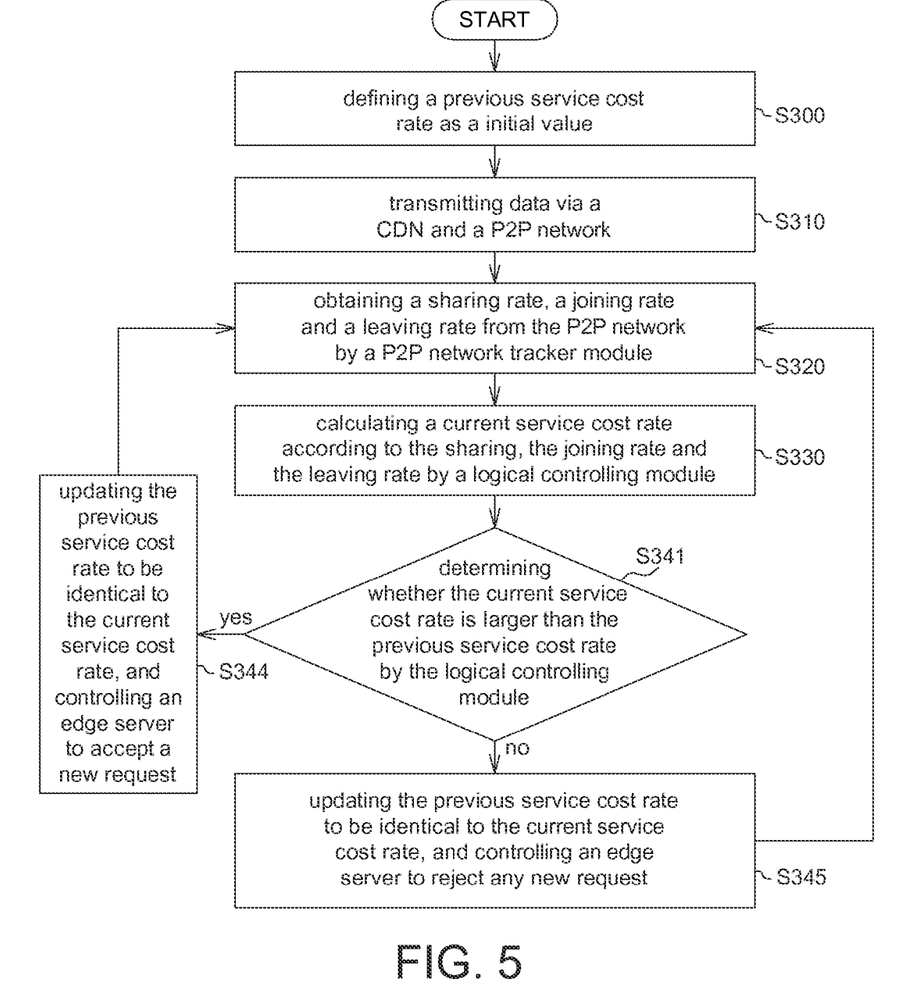
FIG. 5 shows a flow chart of another embodiment of the method for controlling the flow of the CDN and the P2P network.

In step S320, the P2P network tracker module 100 obtains the sharing rate ρ, the joining rate λ and the leaving rate σ from the P2P network 6000.

In step S330, the logical controlling module 200 calculates the current service cost rate f(ρ,λ,σ) according to the sharing rate ρ, the joining rate λ and the leaving rate σ. The current service cost rate f(ρ,λ,σ) is calculated by the equation (3).

In another embodiment, the service cost rate f(k,ρ,λ,σ) can be calculated according to the sharing rate ρ, the joining rate λ, the leaving rate σ and the current maximum level k. The edge server 500 is controlled to accept or reject one or more new requests according to the comparison between the current service cost rate f(k,ρ,λ,σ) and the previous service cost rate f(k,ρ,λ,σ), or the comparison between the current service cost rate f(k,ρ,λ,σ) and the default value, or the comparison between the current maximum level k and the maximum tolerable level. For example, please refer to FIG. 6, which shows a flow chart of another embodiment of the method for controlling the flow of the CDN 5000 and the P2P network 6000. Steps S400, S410, S441, S444 and S445 are similar to steps S200, S210, S241, S244 and S245 of FIG. 4, and are omitted here.

Figure 6:
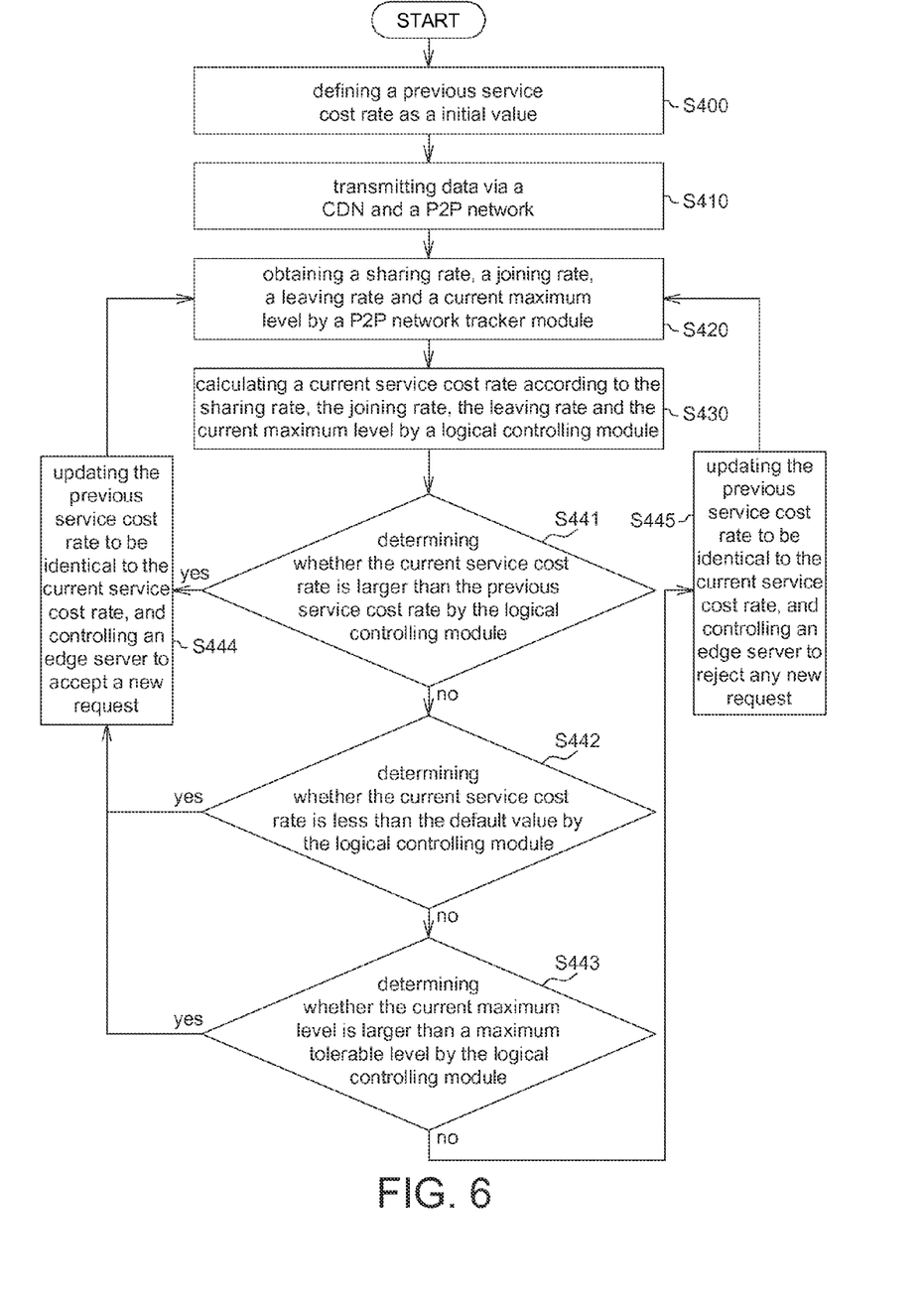
FIG. 6 shows a flow chart of another embodiment of the method for controlling the flow of the CDN and the P2P network.

In step S420, the P2P network tracker module 100 obtains the sharing rate ρ, the joining rate λ, the leaving rate σ and the current maximum level k.

In step S430, the logical controlling module 200 calculates the current service cost rate f(k,ρ,λ,σ) according to the sharing rate ρ, the joining rate λ, the leaving rate σ and the current maximum level k. The current service cost rate f(k,ρ,λ,σ) is calculated by the equation (1).

In step S442, the logical controlling module 200 determines whether the current service cost rate f(k,ρ,λ,σ) is less than a default value. If the current service cost rate f(k,ρ,λ,σ) is less than the default value, then the process proceeds to step S444; if the current service cost rate f(k,ρ,λ,σ) is not less than the default value, then the process proceeds to step S443.

In step S443, the logical controlling module 200 determines whether the current maximum level k is larger than a maximum tolerable level, such as 25. If the current maximum level k is larger than the maximum tolerable level, then the process proceeds to step S444; if the current maximum level k is not larger than the maximum tolerable level, then the process proceeds to step S445.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for controlling a flow of a content delivery network (CDN) and a peer to peer (P2P) network, comprising:
   transmitting data via the CDN and the P2P network;
   obtaining a sharing rate from the P2P network by a P2P network tracker module;
   calculating a first service cost rate according to the sharing rate by a logical controlling module; and
   controlling the CDN to accept or reject one or more new requests from the P2P network according to the first service cost rate by the logical controlling module, wherein the P2P network tracker module further obtains a current maximum level, and the step of controlling the CDN comprises:
   controlling the CDN to accept the one or more new requests by the logical controlling module, if the current maximum level is larger than a maximum tolerable level.

2. The method for controlling the flow of the CDN and the P2P network according to claim 1, wherein the step of controlling the CDN comprises:

controlling the CDN to accept the one or more new requests from the P2P network by the logical controlling module, if the first service cost rate is larger than a second service cost rate.

3. The method for controlling the flow of the CDN and the P2P network according to claim 1, wherein the step of controlling the CDN comprises:
controlling the CDN to reject the one or more new requests by the logical controlling module, if the first service cost rate is not larger than a second service cost rate.

4. The method for controlling the flow of the CDN and the P2P network according to claim 1, wherein the P2P network tracker module further obtains a joining rate and a leaving rate, in the step of calculating the first service cost rate, the first service cost rate is calculated according to the sharing rate, the joining rate and the leaving rate by the logical controlling module, and the step of controlling the CDN comprises:
controlling the CDN to accept the one or more new requests by the logical controlling module, if the first service cost rate is larger than a second service cost rate.

5. The method for controlling the flow of the CDN and the P2P network according to claim 1, wherein the P2P network tracker module further obtains a joining rate and a leaving rate, in the step of calculating the first service cost rate, the first service cost rate is calculated according to the sharing rate, the joining rate and the leaving rate by the logical controlling module, and the step of controlling the CDN comprises:
controlling the CDN to reject the one or more new requests by the logical controlling module, if the first service cost rate is not larger than a second service cost rate.

6. The method for controlling the flow of the CDN and the P2P network according to claim 1, wherein the P2P network tracker module further obtains a joining rate and a leaving rate, in the step of calculating the first service cost rate, the first service cost rate is calculated according to the sharing rate, the joining rate, the leaving rate and the current maximum level by the logical controlling module, and the step of controlling the CDN comprises:
controlling the CDN to accept the one or more new requests by the logical controlling module, if the first service cost rate is larger than a second service cost rate.

7. The method for controlling the flow of the CDN and the P2P network according to claim 1, wherein the P2P network tracker module further obtains a joining rate and a leaving rate, in the step of calculating the first service cost rate, the first service cost rate is calculated according to the sharing rate, the joining rate, the leaving rate and the current maximum level by the logical controlling module, and the step of controlling the CDN comprises:
controlling the CDN to reject the one or more new requests by the logical controlling module, if the first service cost rate is not larger than a second service cost rate.

8. The method for controlling the flow of the CDN and the P2P network according to claim 1, wherein the step of controlling the CDN comprises:
controlling the CDN to accept the one or more new requests by the logical controlling module, if the first service cost rate is less than a default value.

9. The method for controlling the flow of the CDN and the P2P network according to claim 1, wherein the step of controlling the CDN comprises:
controlling the CDN to reject the one or more new requests by the logical controlling module, if the first service cost rate is not less than a default value.

10. The method for controlling the flow of the CDN and the P2P network according to claim 1, wherein the step of controlling the CDN comprises:
controlling the CDN to reject the one or more new requests by the logical controlling module, if the current maximum level is not larger than the maximum tolerable level.

11. The method for controlling the flow of the CDN and the P2P network according to claim 1, wherein the CDN is controlled to accept the one or more new requests by the logical controlling module, if an absolute value of a first order derivation of the first service cost rate is increased with an increase of the current maximum level.

12. The method for controlling the flow of the CDN and the P2P network according to claim 1, further comprising:
updating a second service cost rate to be identical to the first service cost rate.

13. The method for controlling the flow of the CDN and the P2P network according to claim 1, wherein the first service cost rate is $(1-\rho)$, and $\rho$ is the sharing rate.

14. The method for controlling the flow of the CDN and the P2P network according to claim 1, wherein the P2P network tracker module further obtains a joining rate and a leaving rate, the first service cost rate is $(1-\rho)(1+\lambda-\sigma)$, $\rho$ is the sharing rate, $\sigma$ is the leaving rate, and $\lambda$ is the joining rate.

15. The method for controlling the flow of the CDN and the P2P network according to claim 1, wherein the P2P network tracker module further obtains a joining rate and a leaving rate, the first service cost rate is $$\frac{(1-\rho)(1+\lambda-\sigma)^k}{(1-\rho^k)(1-\sigma)^{k-1}},$$

is the sharing rate, $\sigma$ is the leaving rate, $\lambda$ is the joining rate, and k is the current maximum level.

16. A system for controlling a flow of a content delivery network (CDN) and a peer to peer (P2P) network, comprising:
a P2P network tracker module, for obtaining a sharing rate from the P2P network; and
a logical controlling module, for calculating a first service cost rate according to the sharing rate and controlling the CDN to accept or reject one or more new requests from the P2P network according to the first service cost rate, wherein the logical controlling module controls the CDN to accept the one or more new requests, if a current maximum level is larger than a maximum tolerable level.

17. The system for controlling the flow of the CDN and the P2P network according to claim 16, wherein the P2P network tracker module further obtains a joining rate and a leaving rate from the P2P network.

18. The system for controlling the flow of the CDN and the P2P network according to claim 17, wherein the P2P network tracker module further obtains the current maximum level from the P2P network.

19. The system for controlling the flow of the CDN and the P2P network according to claim 16, wherein the logical controlling module calculates the first service cost rate according to the sharing rate, a joining rate, a leaving rate and the current maximum level, and controls the CDN to accept or reject the one or more new requests from the P2P network according to the first service cost rate.

20. The system for controlling the flow of the CDN and the P2P network according to claim 16, wherein the logical controlling module controls the CDN to accept the one or more new requests, if the first service cost rate is larger than a second service cost rate.

21. The system for controlling the flow of the CDN and the P2P network according to claim 16, wherein the logical controlling module controls the CDN to reject the one or more new requests, if the first service cost rate is not larger than a second service cost rate.

22. The system for controlling the flow of the CDN and the P2P network according to claim 16, wherein the logical controlling module controls the CDN to accept the one or more new requests, if the first service cost rate is less than a default value.

23. The system for controlling the flow of the CDN and the P2P network according to claim 16, wherein the logical controlling module controls the CDN to reject the one or more new requests, if the first service cost rate is not less than a default value.

24. The system for controlling the flow of the CDN and the P2P network according to claim 16, wherein the logical controlling module controls the CDN to reject the one or more new requests, if the current maximum level is not larger than the maximum tolerable level.

25. The system for controlling the flow of the CDN and the P2P network according to claim 16, wherein the CDN is controlled to accept the one or more new requests by the logical controlling module, if an absolute value of a first order derivation of the first service cost rate is increased with an increase of the current maximum level.

26. The system for controlling the flow of the CDN and the P2P network according to claim 16, wherein the logical controlling module updates a second service cost rate to be identical to the first service cost rate.

27. The system for controlling the flow of the CDN and the P2P network according to claim 16, wherein the first service cost rate is $(1-\rho)$, and $\rho$ is the sharing rate.

28. The system for controlling the flow of the CDN and the P2P network according to claim 16, wherein the P2P network tracker module further obtains a joining rate and a leaving rate, the first service cost rate is $(1-\rho)(1+\lambda-\sigma)$, $\rho$ is the sharing rate, $\sigma$ is the leaving rate, and $\lambda$ is the joining rate.

29. The system for controlling the flow of the CDN and the P2P network according to claim 16, wherein the P2P network tracker module further obtains a joining rate, a leaving rate and the current maximum level, the first service cost rate is $$\frac{(1-\rho)(1+\lambda-\sigma)^k}{(1-\rho^k)(1-\sigma)^{k-1}},$$

$\rho$ is the sharing rate, $\sigma$ is the leaving rate, $\lambda$ is the joining rate, and k is the current maximum level.

* * * * *